(12) United States Patent
Hellenbroich et al.

(10) Patent No.: US 7,111,604 B1
(45) Date of Patent: Sep. 26, 2006

(54) CONNECTING ROD FOR AN INTERNAL COMBUSTION ENGINE

(75) Inventors: Gereon Hellenbroich, Auburn Hills, MI (US); Michael Franke, Auburn Hills, MI (US); Chou Lee, Auburn Hills, MI (US)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 11/204,580

(22) Filed: Aug. 15, 2005

(51) Int. Cl.
*G05G 1/00* (2006.01)
(52) U.S. Cl. ..................... 123/197.3; 74/579
(58) Field of Classification Search ..............................
29/888.09–888.092; 74/579, 581; 123/197.3, 123/197.4
See application file for complete search history.

(56) References Cited

U.S. PATENT DOCUMENTS

| 153,667 | A | * | 8/1874 | Crane | 74/594 |
|---|---|---|---|---|---|
| 369,883 | A | * | 9/1887 | Richards | 74/594 |
| 465,454 | A | * | 12/1891 | Bunker | 74/587 |
| 4,184,384 | A | * | 1/1980 | Levine | 74/579 E |
| 4,403,525 | A | * | 9/1983 | Bongers | 74/579 E |
| 4,805,483 | A | * | 2/1989 | Beckmann et al. | 74/579 E |
| 4,833,939 | A | * | 5/1989 | Beckmann et al. | 74/579 E |
| 4,841,801 | A | * | 6/1989 | Tice | 74/579 R |

* cited by examiner

*Primary Examiner*—Marguerite McMahon
(74) *Attorney, Agent, or Firm*—Townsend and Townsend and Crew LLP

(57) ABSTRACT

The invention relates to a connecting rod for an internal combustion engine, comprising a center rod having a first and a second end, the first end being provided with a big eye and the second end being provided with a connecting piece; wherein the big eye comprises a first and a second cap for taking up a bearing in between, the first cap being arranged on the center rod; at least one endless fiber loop wrapped around the whole connecting rod; and a tensioner arranged over the first cap, the at least one fiber loop being placed between the tensioner and the first cap, the tensioner being connected to the second cap by the fastening elements under assembling together the first and second caps and tensioning the at least one fiber loop.

15 Claims, 2 Drawing Sheets

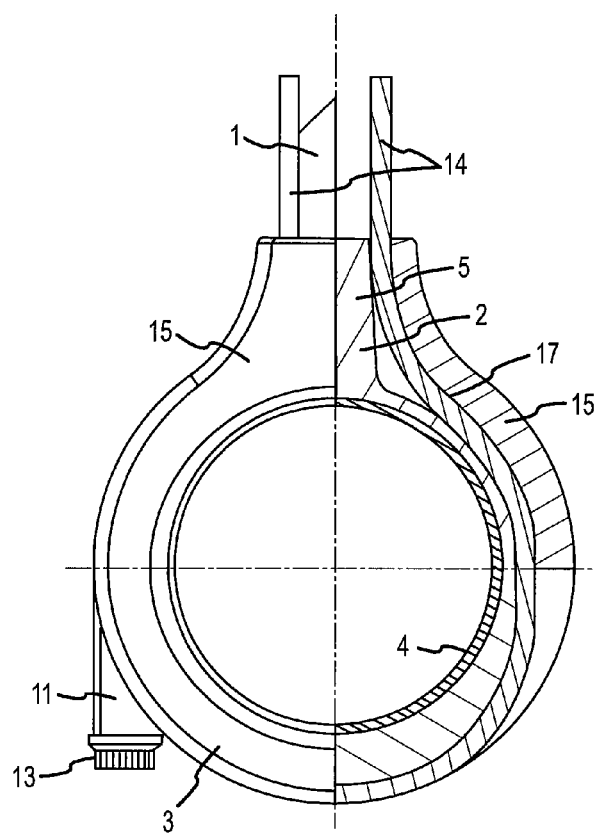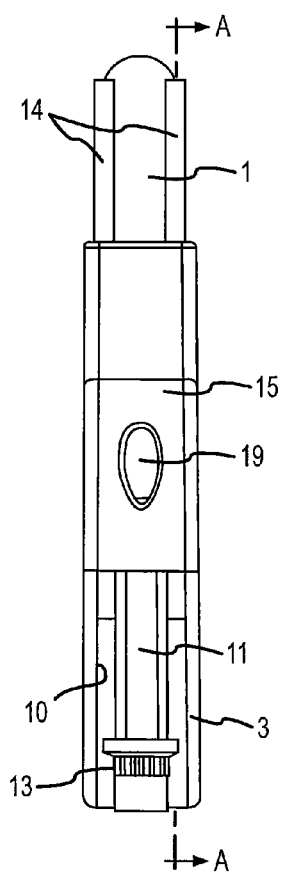
FIG.3                    FIG.2

CONNECTING ROD FOR AN INTERNAL COMBUSTION ENGINE

FIELD OF THE INVENTION

The present invention concerns a connecting rod for an internal combustion engine as it is used generally for connecting a crankshaft of an internal combustion engine with a piston.

BACKGROUND OF THE INVENTION

Normally, connecting rods for connecting a crankshaft of an internal combustion engine with a piston are generally subjected to compressive loads so that the connecting rods should have a sufficient stability against buckling. This especially applies for modern Diesel engines with high cylinder pressures and at the same time comparatively low engine speeds. However, in the case of very high rotational speeds significant tensile loads may appear as a result from inertia forces.

In special internal combustion engines, however, the connecting rods may underlie even higher or predominantly tensile loads. From U.S. Pat. No. 6,170,443 a two-stroke internal combustion engine having opposed cylinders is known. Each cylinder has a pair of opposed pistons, with all pistons connected to a common central crankshaft by connecting rods. The loads are transmitted from the outer pistons to the common crankshaft via connecting rods of a substantial length, and these connecting rods predominantly underlie tensile loads. Because of their length these connecting rods are of a substantial weight.

Additionally, it is known from the German Patent No. DE 34 16 011 C2 to use an endless tensioning tape extending around the whole connecting rod. The tensioning tape taken up by a groove is mounted in such a manner that between the tape and the big eye a space is left which for tensioning purposes is filled by a high viscous liquid which after introduction is brought into its solid state. The tensioning band is not constricted to the shank part of the connecting rod so that the connecting rod occupies a corresponding space.

Further, it is known from published German patent application No. DE 37 20 065 A1 to compose a shank forming the center part and one half of the big eye of a connecting rod of a multitude of laminated plates and to use a tensioning tape extending around the shank. The tensioning tape is held close to the shank by a corresponding cap secured by collars. The ends of the tensioning tape are taken up by an additional holder on the side of the big eye opposite to the shank and tensioning takes place by a tensioning wedge to be actuated by screws. This holder and its wedge occupy additional space.

BRIEF SUMMARY OF THE INVENTION

It is an object of the invention to provide a connecting rod for an internal combustion engine being substantially reduced in weight.

It is a further object of the invention to provide a connecting rod for an internal combustion engine which may be subjected substantial tensile loads.

It is still another object of the invention to provide a connecting rod for a two-stroke internal combustion engine, said connecting rod being substantially reduced in weight and may be subjected substantial tensile loads.

It is an additional object of the invention to provide a connecting rod for an internal combustion engine which matches the shape of conventional connecting rods.

It is a still further object of the invention to provide a connecting rod for an internal combustion engine which may be assembled and disassembled in an easy manner.

It is a still further object of the invention to provide a connecting rod for an internal combustion engine which guarantees a reliable clamping of its big eye bearing.

Thus, the invention provides a connecting rod for an internal combustion engine, comprising:

a center rod having a first and a second end, the first end being provided with a big eye and the second end being provided with a connecting piece;

wherein the big eye comprises a first and a second cap for taking up a bearing in between, the first cap being arranged on the center rod;

at least one endless fiber loop wrapped around the whole connecting rod; and a tensioner arranged over the first cap, the at least one fiber loop being placed between the tensioner and the first cap, the tensioner being connected to the second cap by the fastening elements while assembling the first and second caps and tensioning the at least one fiber loop.

The use of an endless fiber loop allows to take up tensile loads by the fiber loop, whereas the center rod takes up compressive loads as far as necessary. This allows to substantially reduce the weight of the connecting rod in comparison with a solid connecting rod. Additionally, the invention allows to obtain a slender shape of the connecting rod by using the tensioner to constrict the fiber loop at the big eyes end while at the same time, i.e. simultaneously assembling the different parts of the connecting rod and providing the required clamping force for the bearing shells. Assembling and disassembling can be done easily.

Further objects, advantages and embodiments of the invention may be gathered from the following description.

BRIEF DESCRIPTION OF THE DRAWINGS

The invention will now be explained below in detail on the basis of an exemplary embodiment of the invention as shown in the attached drawings.

FIG. 2 shows an enlarged side view of the end of the connecting rod of FIG. 1.

FIG. 3 shows on the left hand side an enlarged front view and on the right hand side a sectional view of the end of the connecting rod of FIG. 1 according to line A—A.

DETAILED DESCRIPTION OF THE INVENTION

Figure 1:
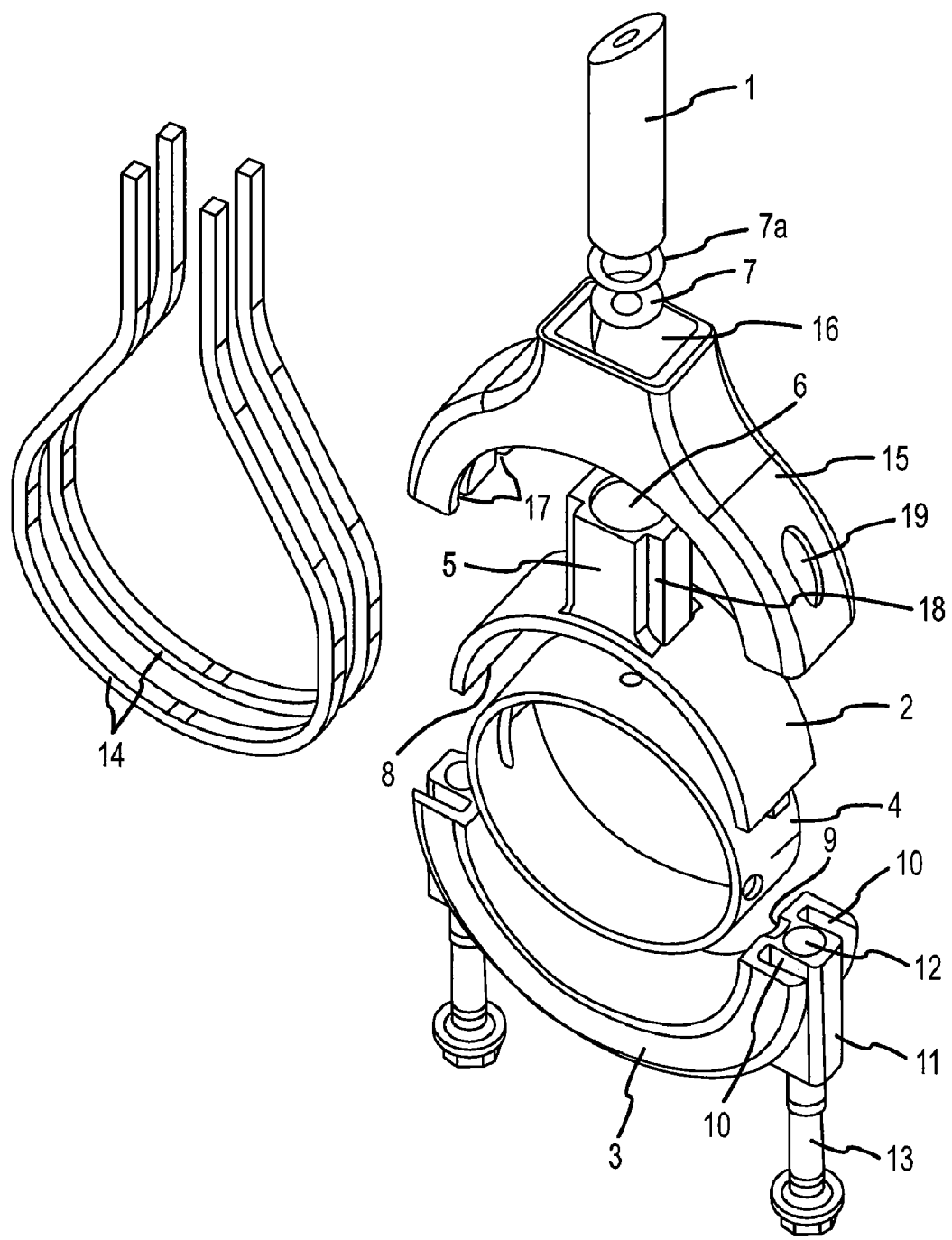
FIG. 1 shows an exploded perspective view of one end of a connecting rod according to an embodiment of the invention.

The embodiment of the connecting rod shown in the drawings comprises a center rod 1 in the form of a rod or a hollow rod, i.e. a tube of circular or non-circular cross section. The center rod 1 may be of conventional material such as, but not limited to, steel, aluminium, and titanium. However, a light weight material in the form of a fiber-reinforced composite material is preferred.

The connecting rod further comprises a first cap 2 and a second cap 3. The caps 2 and 3 are substantially semicircular to take up a bearing 4, according to this embodiment two bearing shell halves of a big-end bearing. The first cap 2 is provided with a hollow pilot 5 having a central opening or bore 6 taking up the center rod 1. Spring elements 7 and/or shims 7a may be inserted into bore 6 before the insertion of the center rod 1. The pilot 5 preferably has a cross section with a polygonal outer contour.

The first and second caps 2, 3 and the bearing 4 form a big eye at the corresponding end of the connecting rod.

One of the caps 2, 3 has protrusions or pins 8 which are taken up by openings 9 of the other cap to center the caps 2, 3 with respect to each other.

The second cap 3 is provided with at least one groove 10 open to the exterior (in the shown embodiment two grooves 10). Further, the second cap 3 has two or more bosses 11 with bores 12 opening to the middle plane between the first and second caps 2, 3. Each bore 12 takes up a stud or a bolt 13.

The connecting rod further comprises at least one endless fiber loop 14 (in the shown embodiment two fiber loops 14). The fiber loops 14 are wrapped around the whole connecting rod, i.e. around the big eye at the shown end of the connecting rod and a (not shown) connecting piece at the other end of the connecting rod. The connecting piece may be a small eye or a connecting head or a connecting bridge between two adjacent connecting rods. In the area of the second cap 3 the fiber loops 14 are taken up by the grooves 10.

The fiber loop 14 may be of steel, however, a light weight material in the form of a fiber structure or a fiber reinforced composite structure, especially a carbon fiber reinforced one, is preferred.

Additionally, a solid tensioner 15 is provided. The tensioner 15 has an opening 16, in this embodiment a rectangular one, for taking up the pilot 5 of the first cap. In the interior surface of the substantially semicircular tensioner 15 grooves 17 are provided. The grooves 17 partly take up the fiber loops 14 emerging from the grooves 10 of the second cap 3. The fiber loops 14 emerging from the opening 16 adjacent to the center rod 1 are taken up further partly by grooves 18 of the pilot 5. The grooves 18 are preferably arranged along the edges of the pilot 5.

The tensioner 15 further possesses two or more threaded bores 19 to be screwed together with the second cap 3 by the bolts 13. Alternatively, the bolts 13 may be replaced by studs and nuts. The tensioner 15 then possesses two or more threaded blind holes to take up the studs.

By fastening the tensioner 15 during the assembly of the connecting rod, the first and second caps 2, 3 are tensioned against each other under clamping the bearing 4. At the same time, the fiber loops 14 taking up the main part of axial tensile loads onto the connecting rod are tensioned.

Instead of several separate fiber loops 14 according to the shown embodiment only one fiber loop may be used which is split when entering and running through the first and second caps 2, 3 and the tensioner 15.

For assembling the connecting rod the fiber loops 14 are pulled over the crankshaft of the corresponding internal combustion engine. Then the first and second caps 2, 3 and the bearing shells of the bearing 4 are put in place on the crank pin. Now the center rod 1 is plugged into the pilot 5 of the first cap 2. It also may have been connected to the first cap 2 earlier or even form one part with the first cap 2. Next the fiber loops 14 are arranged around the crankpin and the pre-mounted parts in a near net shape. The tensioner 15 then slides over the fiber loops 14 and the center rod 1. All additional parts forming the connecting piece at the other end of the connecting rod as for instance a small eye are then put in place and the fiber loops 14 are moved into their final position. If the tensioner 15 fits over the connecting piece, the connecting piece also may have been connected to the center rod 1 earlier or even form one part with the center rod 1. The tensioner 15 now slides towards the big eye. As soon as the tension of the fiber loops 14 prevents the tensioner 15 from being slid any further manually, the bolts 13 should be able to be screwed into the tensioner 15 for final tensioning.

For an optimum clamping of the bearing 4 and stiffness of the connecting rod, the length of the fiber loops 14 should exactly allow to pull together the tensioner 15 and the second cap 3. Tolerances may be compensated by choosing the appropriate stiffness for the center rod 1 and the fiber loop 14. Spring elements 7, e.g. spring discs, may be incorporated to compensate for tolerances. However, also shims 7a of appropriate thickness may be inserted instead or together with the springs elements 7. The spring element(s) or shim(s) may also be inserted between the center rod 1 and the connecting piece or between the fiber loop and the second cap 3 or the connecting piece.

Thus, the invention allows to provide connecting rods able to take up compressive and tensile loads due to a solid tensioner 15. Even in the case of modern diesel engines in which high combustion forces act as a tensile load on the connecting rods the invention is applicable. Assembling and disassembling can be done without the need for any additional fixtures or special tools. The shape of the connecting rod matches the shape of a conventional one, since the tensioner 15 constricts the fiber loops 14 accordingly. Therefore, no clearance problems arise within the crankcase of the internal combustion engine. The clamping force needed for clamping the bearing 4 of the big eye of the connecting rod is provided by the bolts 13 or corresponding studs, thus utilizing a reliable and well proven solution.

While the invention has been shown and described with reference to preferred embodiments, it should be apparent to one of ordinary skill in the art that many changes and modifications may be made without departing from the spirit and scope of the invention as defined in the claims.

What is claimed is:

1. A connecting rod for an internal combustion engine, comprising:
   a center rod having a first and a second end, the first end being provided with a big eye and the second end being provided with a connecting piece;
   wherein the big eye comprises a first and a second cap for taking up a bearing in between, the first cap being arranged on the center rod;
   at least one endless fiber loop wrapped around the whole connecting rod; and
   a tensioner arranged over the first cap, the at least one fiber loop being placed between the tensioner and the first cap and emerging from the tensioner to run along the center rod, the tensioner being connected to the second cap by the fastening elements while assembling the first and second caps and tensioning the at least one fiber loop.

2. The connecting rod of claim 1, wherein the fiber loop is taken up by at least one groove of the second cap extending along the outer periphery of the second cap.

3. The connecting rod of claim 1, wherein at least one of the tensioner and the first cap, the first cap on its outer side and the tensioner on its inner side, is provided with at least one groove taking up the at least one fiber loop.

4. The connecting rod of claim 1, wherein the first cap is provided with a hollow pilot taking up one end of the center rod.

5. The connecting rod of claim 1, wherein the center rod is of any desired cross section.

6. The connecting rod of claim 1, wherein the center rod is a fiber reinforced rod.

7. The connecting rod of claim 1, wherein the fiber loop is of a fiber reinforced composite material.

8. The connecting rod of claim 7, wherein the fiber loop is of a carbon fiber reinforced composite material.

9. The connecting rod of claim 1, wherein the center rod fits into a pilot of the first cap.

10. The connecting rod of claim 9, wherein the tensioner fits onto the pilot of the first cap.

11. The connecting rod of claim 1, wherein the center rod is biased towards one of its ends by a spring load.

12. The connecting rod of claim 1, wherein at least one element of shims and springs is provided to compensate tolerances.

13. The connecting rod of claim 12, wherein at least one element of shims and springs is provided between the center rod and the first cap.

14. The connecting rod of claim 1, wherein the fiber loop comprises fibers.

15. The connecting rod of claim 13, wherein the fiber loop comprises carbon fibers.

* * * * *